(12) United States Patent
Tada et al.

(10) Patent No.: US 6,524,202 B1
(45) Date of Patent: Feb. 25, 2003

(54) BLADE-TYPE CHAIN TENSIONER

(75) Inventors: Naosumi Tada, Nabari (JP); Shinji Tsuruta, Nabari (JP)

(73) Assignee: Borg-Warner Automotive, K.K., Nabari (JP)

( * ) Notice: Subject to any disclaimer, the term of this patent is extended or adjusted under 35 U.S.C. 154(b) by 0 days.

(21) Appl. No.: 09/481,792

(22) Filed: Jan. 12, 2000

(30) Foreign Application Priority Data

Feb. 15, 1999 (JP) .............................. 11-035406

(51) Int. Cl.[7] .................................................. F16H 7/08
(52) U.S. Cl. ........................................ 474/109; 474/140
(58) Field of Search ................. 474/109, 110, 474/111, 140

(56) References Cited

U.S. PATENT DOCUMENTS

| | | |
|---|---|---|
| 3,276,282 A | 10/1966 | Duncan |
| 3,490,302 A | 1/1970 | Turner et al. |
| 4,921,472 A | 5/1990 | Young |
| 4,983,145 A * | 1/1991 | Hirai et al. ............. 474/110 X |
| 5,055,088 A | 10/1991 | Cradduck et al. |
| 5,234,385 A | 8/1993 | Kawashima et al. ........ 474/135 |
| 5,266,066 A | 11/1993 | White |
| 5,286,234 A | 2/1994 | Young |
| 5,425,680 A | 6/1995 | Young |
| 5,462,493 A | 10/1995 | Simpson |
| 5,662,540 A * | 9/1997 | Schnuepke et al. ......... 474/111 |
| 5,665,019 A * | 9/1997 | Scheffer et al. ............. 474/111 |
| 5,797,818 A | 8/1998 | Young ......................... 474/111 |
| 5,846,150 A * | 12/1998 | Wigsten ...................... 474/140 |
| 5,984,815 A | 11/1999 | Baddaria |
| 6,086,498 A * | 7/2000 | Hashimoto ................... 474/111 |
| 6,120,403 A * | 9/2000 | Suzuki et al. ............... 474/111 |

FOREIGN PATENT DOCUMENTS

| | | | |
|---|---|---|---|
| DE | 19807822 A1 | 8/1998 | ........... F16C/11/04 |
| JP | 58-074941 | 5/1983 | ............. F16H/7/18 |
| JP | 2-266162 | 10/1990 | ............... F16J/1/16 |
| JP | 4-185945 | 7/1992 | ............. F16H/7/08 |

OTHER PUBLICATIONS

European Search Report dated Feb. 22, 2001 for EP Applc. No. 00300920.6–2306.

* cited by examiner

*Primary Examiner*—David A. Bucci
*Assistant Examiner*—Colby Hansen
(74) *Attorney, Agent, or Firm*—Fitch, Even, Tabin & Flannery; Greg Dziegielewski

(57) ABSTRACT

A blade-type tensioner for chain drives which is suitable for use as a tensioner on the timing chain of a motor vehicle engine. The present invention is a chain tensioner particularly suited for use in confined spaces having a blade spring element mechanically interlocked with a plastic shoe. The shoe may be of rigid filled nylon and engages the chain to be tensioned. The spring element is interlocked to the plastic shoe by having ends inserted into grooves formed in the opposite ends of the shoe. The shoe has a metal bushing fixed in one end. The shoe is rotatably attached to a metal pin inserted through the bushing, the pin being fixed to a base.

10 Claims, 9 Drawing Sheets

BLADE-TYPE CHAIN TENSIONER

BACKGROUND OF THE INVENTION

This invention relates generally to a chain tensioner for chain drives which is particularly, though not exclusively, suitable for use as a tensioner on the timing chain of a motor vehicle engine. The present invention is a chain tensioner particularly suited for use in confined spaces having a flat blade spring element mechanically interlocked with a plastic shoe. The shoe may be of rigid filled nylon and engages the chain to be tensioned.

Conventionally, a blade tensioner is used as the tensioner to apply tension force onto a chain. One form of blade chain tensioner is shown in U. S. Pat. No. 3,490,302, which is incorporated herein by reference. Another example of a prior art blade tensioner is shown in FIGS. 9–11 herein.

As shown in FIG. 9, the conventional blade tensioner 100 is composed of a shoe 101 made of resin that extends in an arcuate form. Multiple blade springs 102 extend along shoe 101 and are mounted on shoe 101. A metal base or plate 120 supports shoe 101. A first projecting portion 110, having a curved surface 110a is formed at the tip or free end of shoe 101. A concave opening or groove 111, for housing one end of blade spring 102, is formed in the projecting portion 110 and shoe 101. A triangular projecting portion 112 is formed on the fixed end of shoe 101. A concave opening or groove 113, for housing the other end of blade spring 102, is formed in the projecting portion 112 and shoe 101.

Attachment holes 121, 122 are formed on base 120. A sliding surface 125 is formed at the tip of base 120 so that projecting part 110, at the tip or free end of the shoe 101 can slide on it while in contact. As shown in FIG. 10, projecting portion 112, on the fixed end of shoe 101 and one end of metal pin 130, is fixed at the center of plate 120 and, on the other hand, a through hole 112a, formed in pin 130, is inserted in the through hole 112a. Stopper ring 131, for shoe 101, is mounted on the tip of pin 130. With this composition, shoe 101 is rotatable ground pin 130. A chain (not shown) runs on sliding surface 101a of shoe 101. When the chain is in operation, a pressure load acts on the chain via shoe 101, as shown in FIG. 11, when the spring 102 deforms.

Not only the chain, but also the tensioner is exposed to wide-ranging temperature fluctuation in an automotive application. Therefore, the components of the tensioner repeat thermal expansion and thermal contraction during automobile operation.

However, in a conventional blade tensioner, the resin shoe is supported by a metal pin and the coefficients of thermal expansion of these components differ greatly from one another. Therefore, the difference occurs in the magnitude of thermal deformation of the shoe and pin and, as a result, smooth rotation of the shoe around the pin is hindered when there are high temperature fluctuations. In this case, the shape of the groove for housing the spring end on the fixed end of the shoe deforms and the operation of the spring can be adversely affected, thereby the blade tensioner response deteriorates.

This invention addresses such conventional problems and offers a blade tensioner that provides reduced deterioration of tensioner response and improves durability.

SUMMARY OF THE INVENTION

The blade tensioner of one embodiment of the present invention includes a blade tensioner that applies tension force to a chain. The blade tensioner has a base or bracket and a chain sliding or contacting surface over which the chain slides. The chain-contacting surface is a surface portion of a resin or plastic shoe having an arcuate shape. The shoe is made of a plastic material which will "creep." "Creep" is the term used in the art to describe the tendency of the shoe to plastically deform in a gradual manner under elevated load and temperature. The fixed or proximal end of the shoe is rotatably mounted to a pin. The pin is formed of metal, preferably steel or aluminum. The pin is fixed to the base. The free end or distal part of the shoe slides freely on an adjacent sliding surface formed on the base. A flat blade spring or multiple blade springs are positioned on the side of the shoe opposite the chain-contacting surface of the shoe. The springs have ends inserted into grooves, slots or housings formed in the opposite ends of the shoe. A bushing is press-fit into a bore formed in the fixed end of the shoe and the pin is inserted rotatably into the bushing. The bushing is made of metal, preferably steel or aluminum, and more preferably being of the same metal as the pin. The bushing is press-fit on the fixed end of the blade shoe. Both the bushing and the pin are made of metal.

Therefore, different from a conventional blade tensioner, the difference in magnitude of thermal deformation of the bushing and pin is small, even with large temperature fluctuations, so that the clearance between these two components can be maintained at a nearly constant value. Thereby, the shoe can rotate smoothly around the pin and, as a result, deterioration of response due to temperature fluctuation can be reduced.

The blade tensioner of a second embodiment includes a blade tensioner that applies tension force to a chain. The blade tensioner has a base or bracket and a chain sliding or contacting surface over which the chain slides. The chain-contacting surface is a surface portion of a resin or plastic shoe. The fixed or proximal end of the shoe is rotatably mounted to a metal pin. The pin is fixed to the base. The free end or distal part of the shoe slides freely on an adjacent sliding surface formed on the base. A flat blade spring or multiple blade springs are positioned on the side of the shoe opposite the chain-contacting surface of the shoe. The springs have ends inserted into grooves, slots or housings formed in the opposite ends of the shoe. A metal bushing is press-fit into a bore formed in the fixed end of the shoe and the pin is inserted rotatably into the bushing. The blade spring end adjacent the fixed end of the shoe is inserted between the bushing and the face of the shoe opposite the chain-contacting surface. The bushing may be any suitable shape in cross-section. Preferably, the cross-section of the bushing is circular or polygonal. The end of the blade spring adjacent the fixed end of the shoe is inserted between the bushing and the blade shoe.

Therefore defective operation of the blade spring due to thermal deformation of the groove or concave part for housing the blade spring which is formed in the fixed end of the shoe does not occur as in the conventional blade tensioner. Thereby, deterioration of response of the blade tensioner is reduced.

The blade tensioner of a third embodiment of the present invention has a shoe provided with an arcuate form mounted to a base. The shoe has a chain sliding surface on which the chain slides. The fixed end of the shoe is provided rotatable around a metal pin that is fixed to the base. A free end of the shoe opposite the fixed end is provided to slide on the sliding surface formed in the base. A blade spring is mounted on the surface of the shoe that is opposite the chain sliding surface of the shoe. A projecting portion is formed at the widthwise center of the blade spring mounting surface of the shoe adjacent the fixed end of the shoe. A stepped bushing made of metal with a center portion having a relatively small diameter is press-fit into a through hole formed in the projecting portion. Large diameter elements, flanges or portions are provided on both ends of the bushing. A cut-out into which the projecting portion of the shoe is inserted is formed in the blade spring adjacent the fixed end of the shoe, and the spring end is inserted in a gap between the large diameter portion of the bushing and the shoe.

The bushing can have either a circular or polygonal cross-section. When it is circular, the contact point of the blade spring with the circular surface of the bushing acts as a pivot for applying the load. When it is polygonal, such as triangular, etc., the contact area of the blade spring (i.e., pressure-bearing area) with the bushing can be made larger when the contact point between blade spring and any one surface of the bushing can be used as a pivot for applying the load, thereby surface pressure and the resulting wear can be reduced. In such case, the span of the blade spring can be maintained at a constant value, so that the loading property of the blade spring can be made linear for easier loading control.

The blade tensioner of a fourth embodiment of the present invention has a large diameter bushing, the cross-section of which is circular or polygonal.

A projecting portion is formed at the widthwise center of the blade spring mounting surface on the shoe fixed end. A small diameter stepped bushing made of metal is press-fit into the through hole in the projecting portion and the pin is supported rotatably in the bushing. Thereby, similarly to the first embodiment of the invention, the shoe rotates smoothly around the pin regardless of temperature, and, as a result, deterioration of the response due to temperature fluctuation can be reduced.

Large diameters elements or portions are formed at both ends of the bushing and a cut-out for insertion of the projecting portion is formed in the blade spring end adjacent the fixed end of the shoe. The spring end adjacent the fixed end of the shoe is inserted in the gap between the large diameter bushing and the shoe and held in place by the bushing. Thereby, similar the second embodiment of the present invention, defective operation of the blade spring and deterioration of response of the blade tensioner can be reduced.

In a fifth embodiment of the invention, a cross-section of the large diameter part of the bushing is circular or polygonal. Therefore, similar to the third embodiment of the present invention, the contact point of the blade spring with the circular surface of the large diameter part of the bushing acts as a load applying pivot when the cross-section is circular.

When the cross-section is polygonal, the area of contact with the blade spring (i.e., pressure bearing area) can be made larger by using the contact point between the blade spring and either surface of the large diameter part of the bushing as a load applying pivot and thereby the surface pressure can be reduced. In this case, the loading property of the blade spring can be made linear because the span of the blade spring can be maintained at a constant value and control of load becomes easier.

When the cross-section of the large diameter of the bushing is polygonal, both ends of the area of contact with the blade spring can be located more toward the edges of the blade spring end than the cut-out, so that the concentration of stress at the cut-out of the blade spring can be avoided under deformation of the blade spring.

For a further understanding of the present invention and the objects thereof, attention is directed to the drawings and the following brief description thereof, to the detailed description of the preferred embodiments of the invention and to the appended claims.

DETAILED DESCRIPTION OF THE PREFERRED EMBODIMENTS

The embodiment mode of this invention is explained below with the aid of the attached figures.

Figure 1:
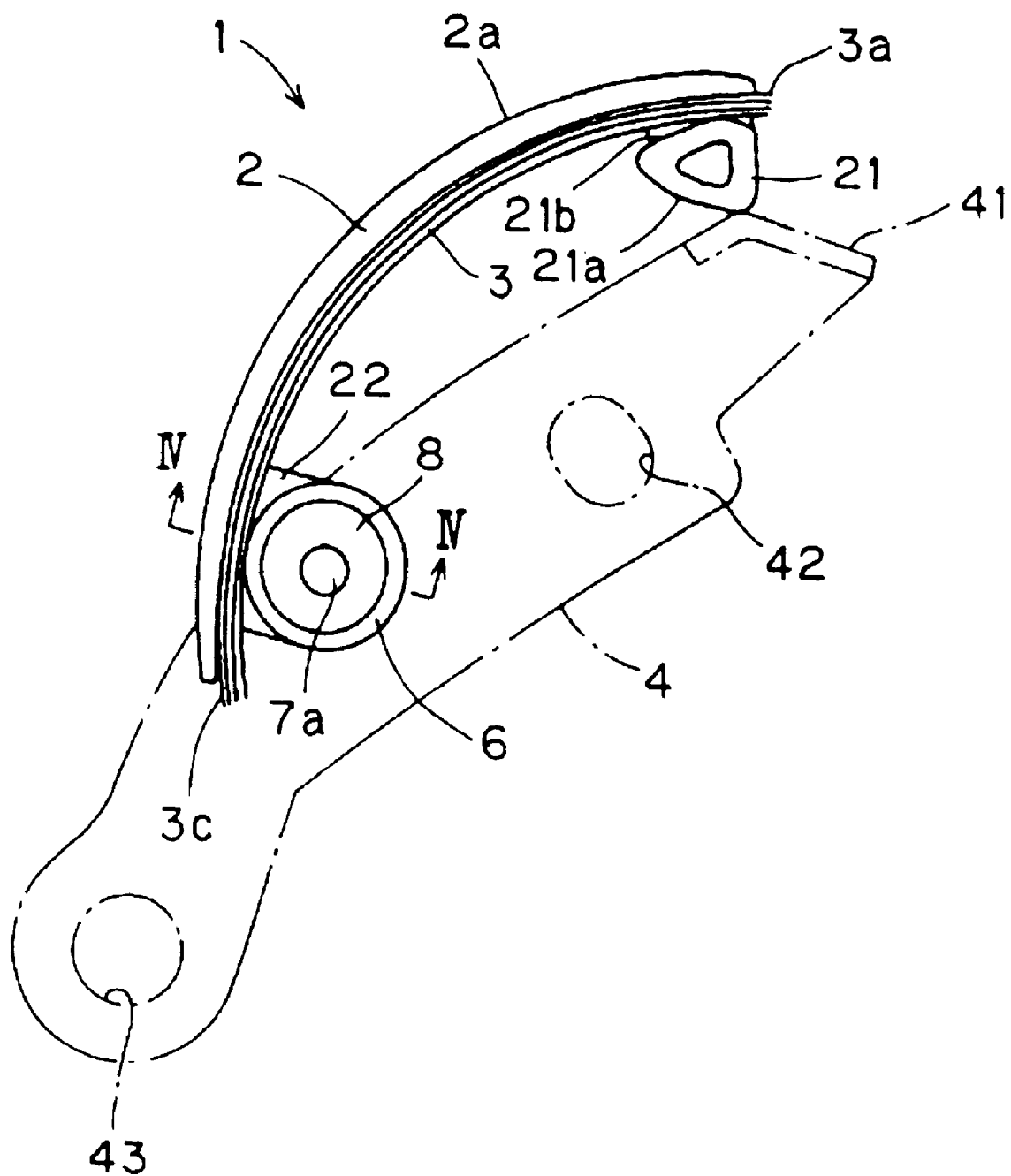
FIG. 1 is a side view of the blade tensioner of the present invention.

As shown in FIG. 1, blade tensioner 1 is mainly composed of a plastic shoe 2 having an arcuate form and having a chain sliding surface 2a, multiple blade springs 3 mounted on the side of the shoe 2 opposite chain sliding surface 2a, and a metal base 4 that supports blade shoe 2.

Figure 2:
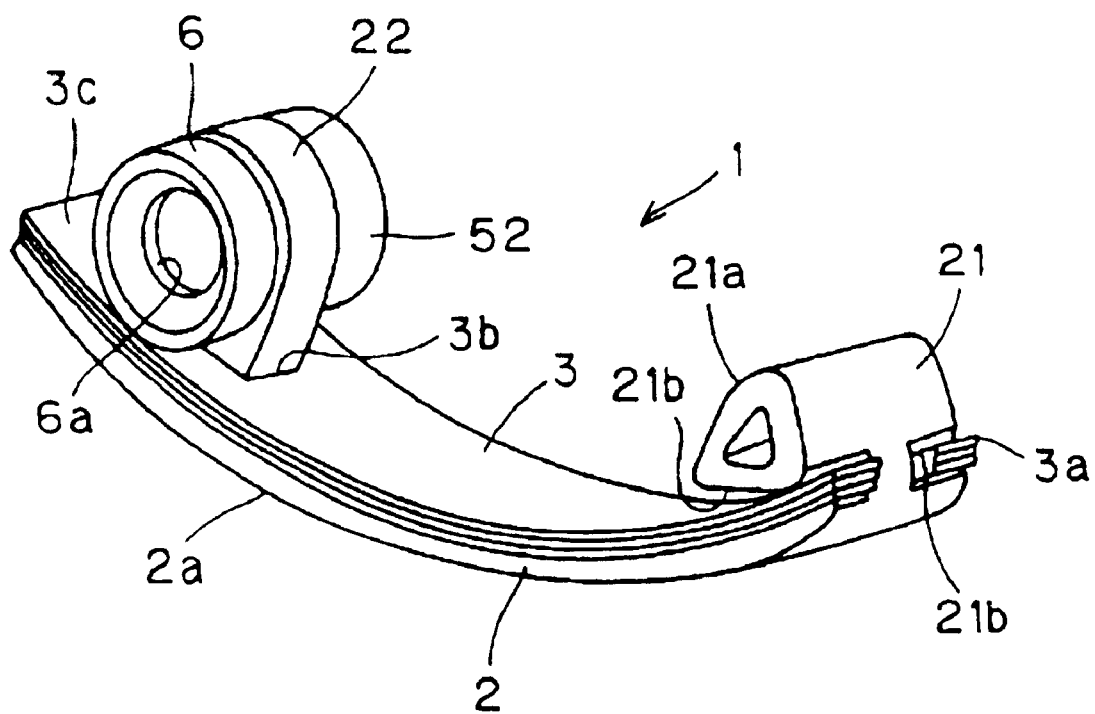
FIG. 2 is a perspective view of the blade tensioner of FIG. 1.

A projecting portion 21 of the shoe is provided on the free end of the blade shoe 2 and an arcuate surface 21a is formed in the projecting portion 21. On the other hand, flat sliding surface 41 is formed at the tip of base 4 and the curved surface 21a of projecting portion 21 of blade shoe 2 is positioned to slide on sliding surface 41. As shown in FIG. 2, a pair of grooves 21b are formed in projecting portion 21. The end of the blade spring 3 adjacent the free end of the shoe 2 is provided a forked shape with two end members 3a with a longitudinal slot therebetween. The forked end of the spring is inserted into groove 21b.

Figure 3:
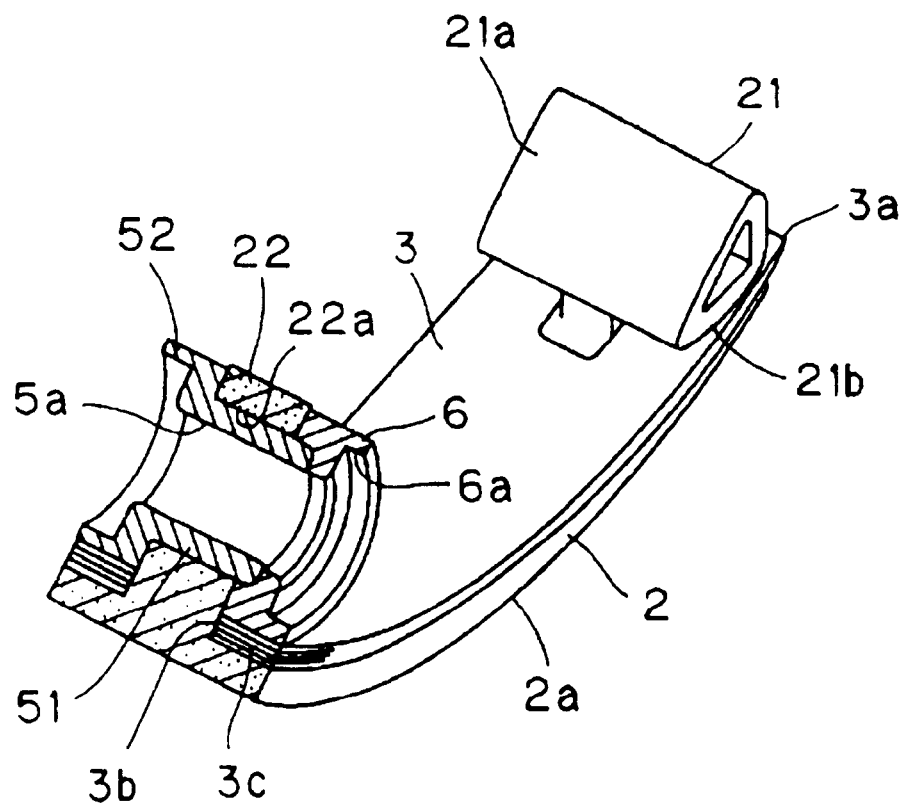
FIG. 3 is a cutaway perspective view of a blade tensioner of the present invention.
Figure 4:
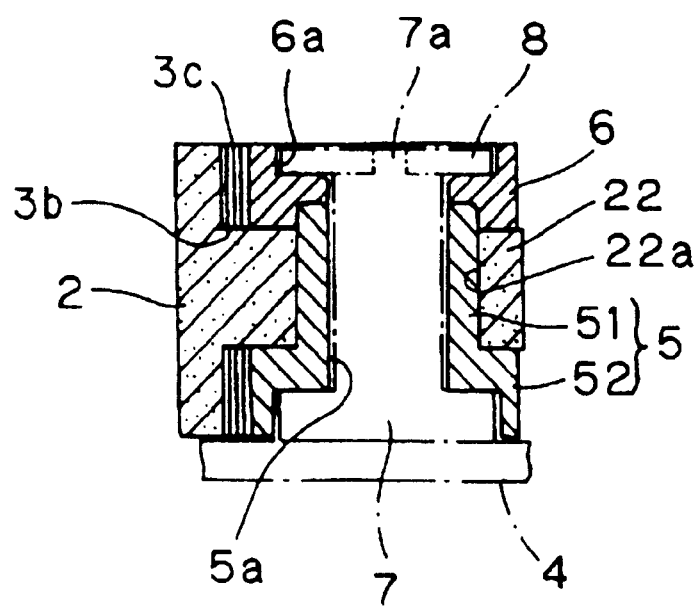
FIG. 4 is a sectional view of FIG. 1 along lines IV—IV.

A projecting portion 22 is formed at the widthwise center of the blade spring mounting surface on the fixed end of blade shoe. As shown in FIGS. 3 and 4, through hole 22a is formed at projecting portion 22 and the small diameter 51 of metal stepped bushing 5 is press-fit into through hole 22a. Bushing 6 that forms the large diameter part, similar to large diameter bushing portion 52, is press-fit in small diameter 51 of stepped bushing 5. A cut-out 3b is formed in end part 3c of blade spring 2 for insertion of projecting portion 22. End part 3c of blade spring 3 is inserted between large diameter 52 of bushing 5 and blade shoe 2, and between bushing 6 and blade shoe 2.

One end of pin 7 is fixed near the center of base 4 and pin 7 penetrates hole 5a of bushing 5. Stopper plate 8 for bushings 5, 6 is press-fit at tip part 7a of pin 7. Plate 8 is inserted in countersunk hole 6a formed in bushing 67. With this composition, shoe 2 is rotatable around pin 7. Incidentally, 42, 43 in FIG. 1 are attachment holes for the base for attachment to an engine block or other anchoring attachment.

Figure 5:
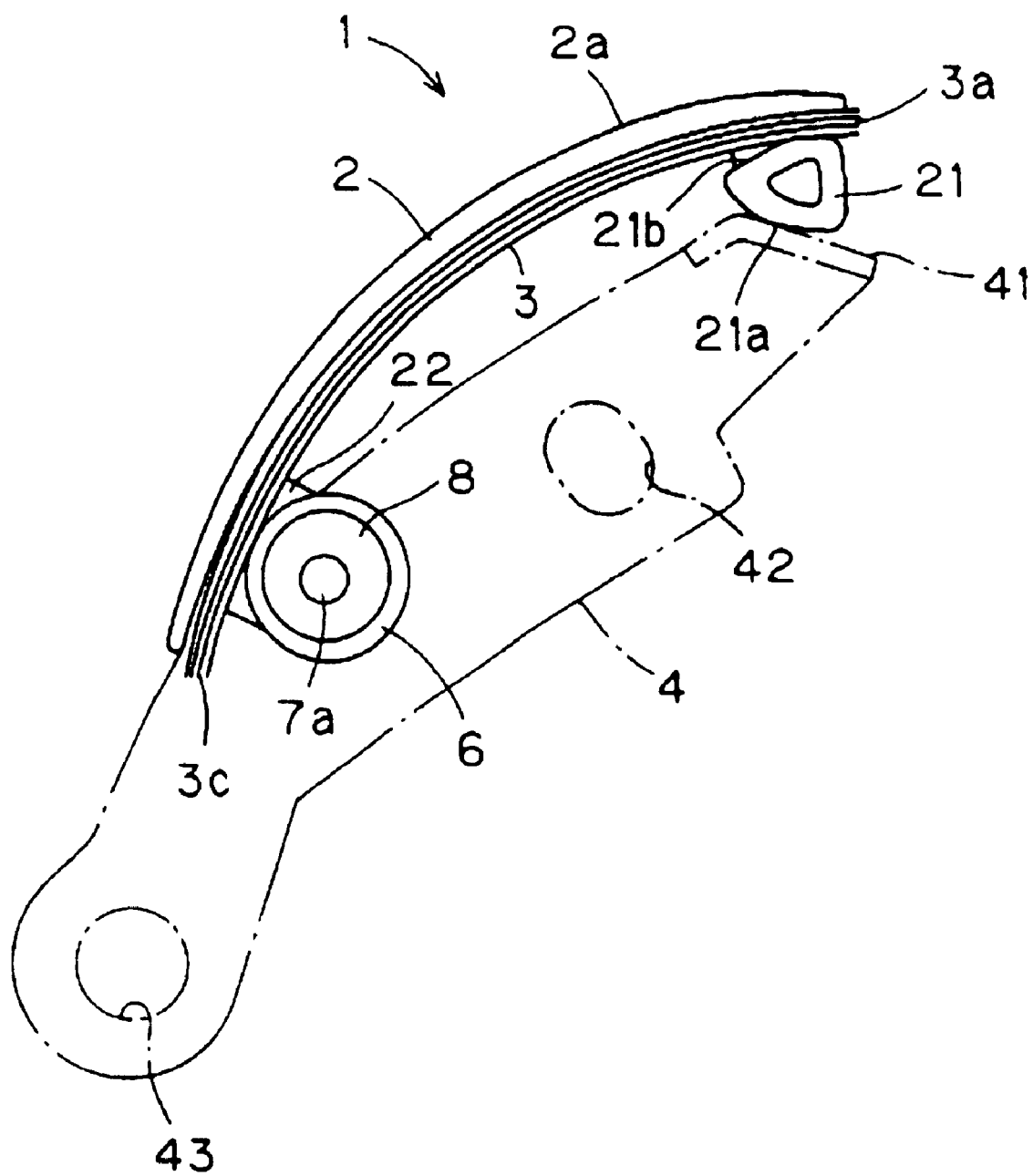
FIG. 5 is a side view of the blade tensioner of FIG. 1.

When the chain is in operation, the chain runs on chain sliding surface 2a of blade shoe 2. At such time, blade shoe 2 deforms toward a more flat shape, as shown in FIG. 5, because chain sliding surface 2a of blade shoe 2 is pressed onto the chain. Thereby, shoe 2 rotates around pin 7 while projecting portion 21 at its free end slides on sliding surface 41 of the base 4. Incidentally, each blade spring 3 deforms similarly when blade shoe 2 deforms and the elastic repulsive force of these blade springs acts on the chain via blade shoe 2.

In this case, as mentioned before, different from a conventional blade tensioner in which a metal pin is directly inserted into a bore formed in the resin shoe, the magnitude of difference in thermal deformations among bushings 5, 6 and 7, where bushings 5, 6 and 7 are all made of metal, is small, even under large temperature fluctuations, and the clearance between the two components remains nearly constant. Thereby, blade shoe 2 rotates smoothly without binding around pin 7, and, as a result, deterioration of response due to temperature fluctuation is reduced.

Furthermore, in this case, in contrast to a conventional blade tensioner, defective operation of the blade spring due to the thermal deformation of the concave part or groove for housing the blade spring formed in the fixed end of the shoe, does not occur, because the spring end 3c adjacent the fixed end of the shoe, is inserted between bushings 5, 6 and 7 and blade shoe 2. Thereby deterioration of the response of the blade tensioner is reduced. The contact point between the outer circumference surface of these bushings 5, 6 (circumferential surface) and blade spring 3 acts as the pivot for applying a load onto blade spring 3 because bushings 5, 6 have circular cross-sections, but bushings 5, 6 need not have an exact circular cross-section. The cross-section can be a circular cross-section including an ellipse, or other generally round shapes.

Figure 6:
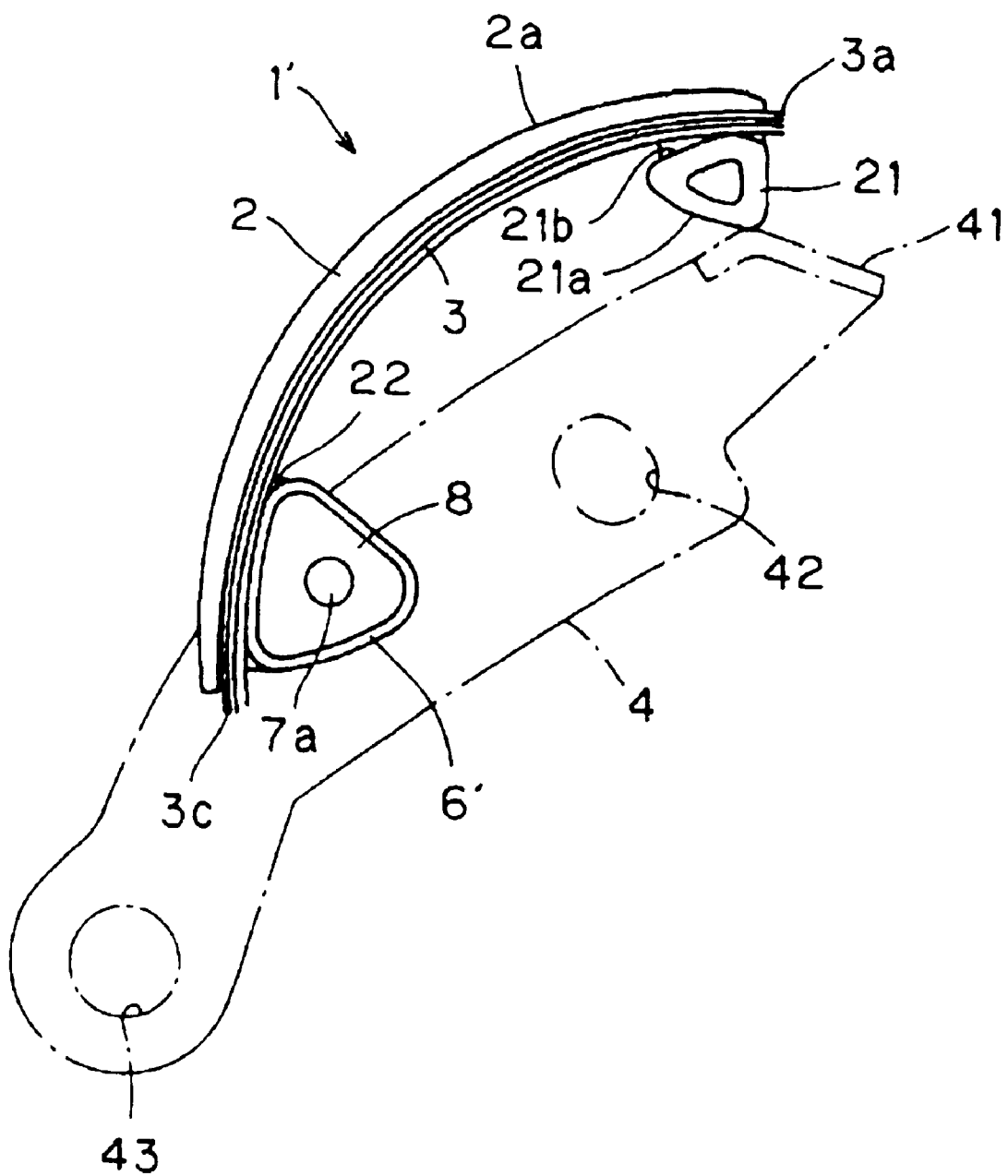
FIG. 6 is a side view of the blade tensioner in another embodiment of the present invention.
Figure 7:
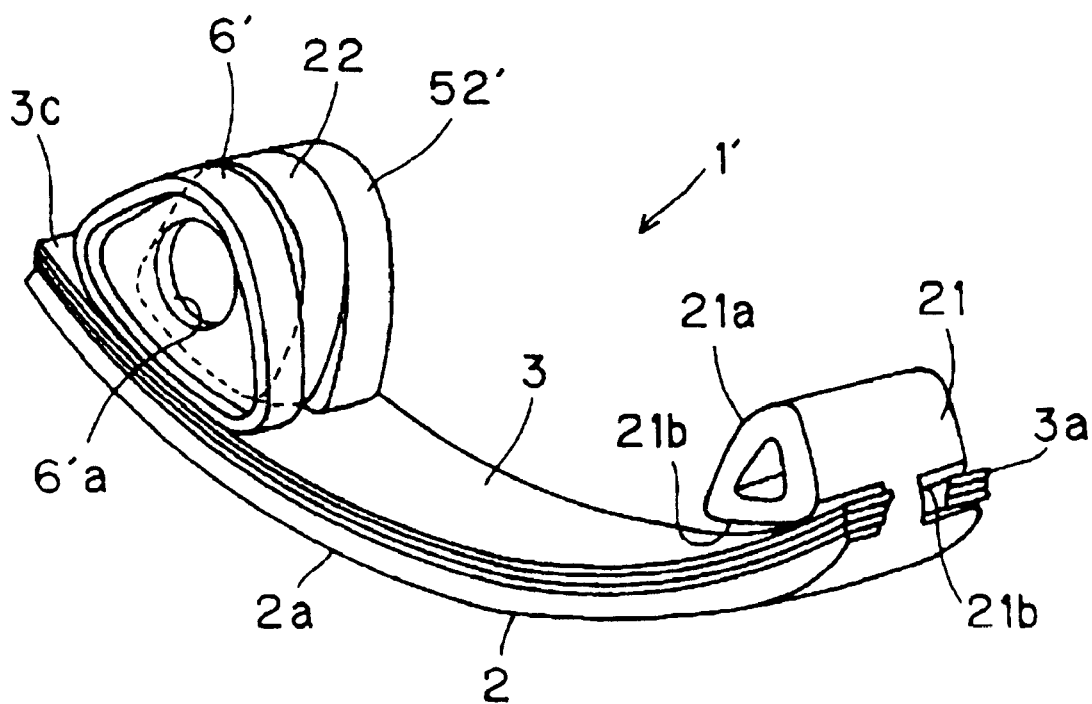
FIG. 7 is a perspective of the blade tensioner of FIG. 6.
Figure 8:
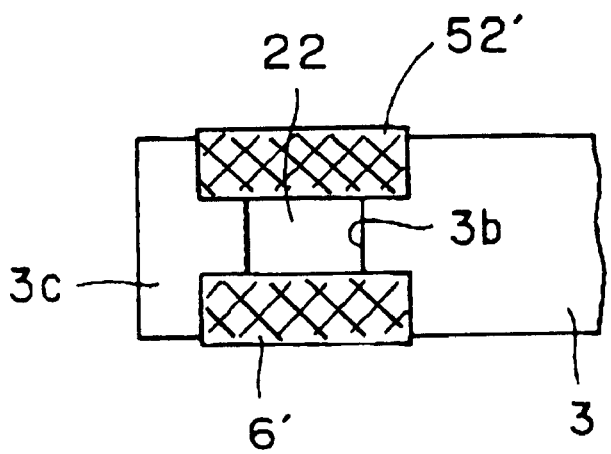
FIG. 8 is a partial plan view of the blade tensioner of the present invention.
Figure 9:
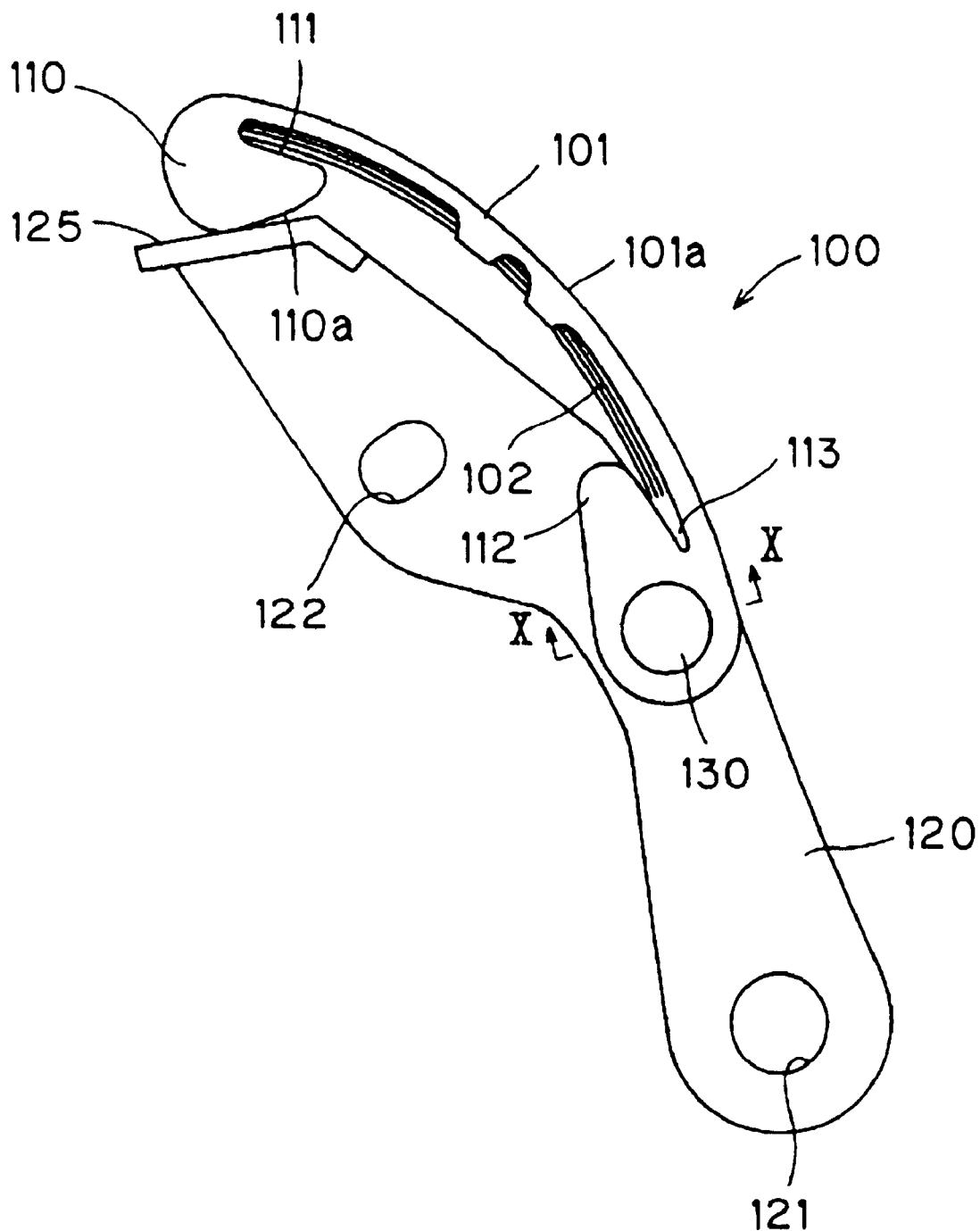
FIG. 9 is a side view of a conventional blade tensioner.
Figure 10:
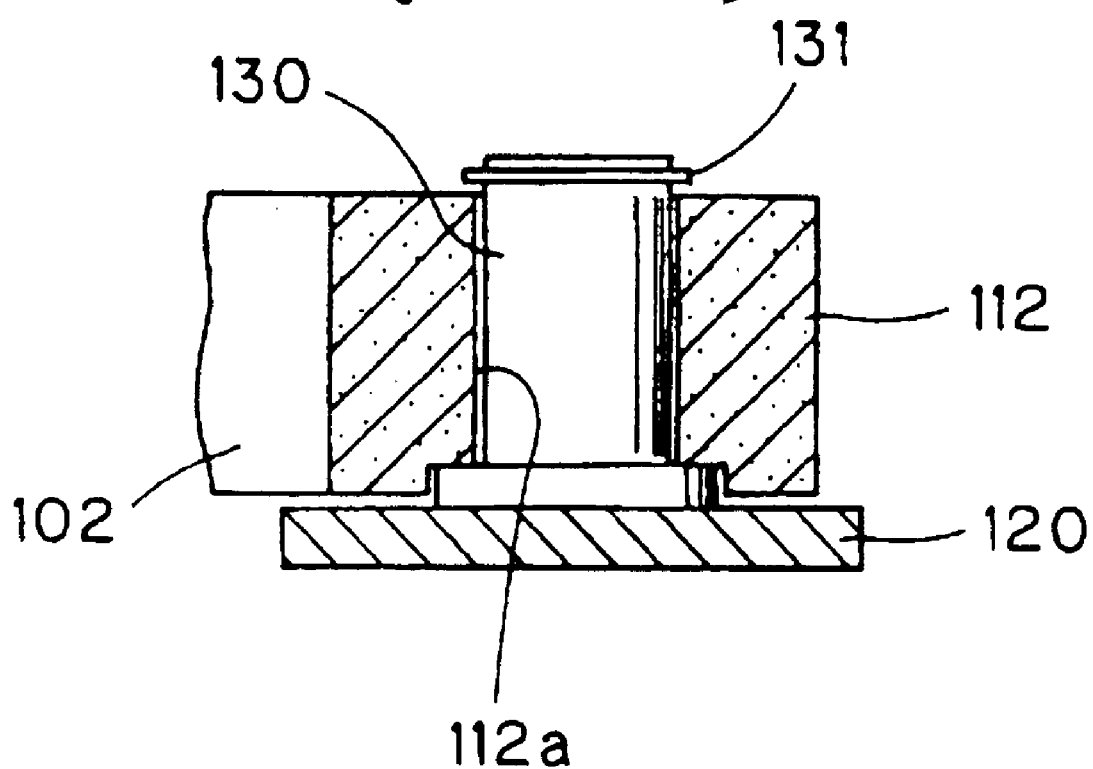
FIG. 10 is a sectional view of section X—X of FIG. 9.
Figure 11:
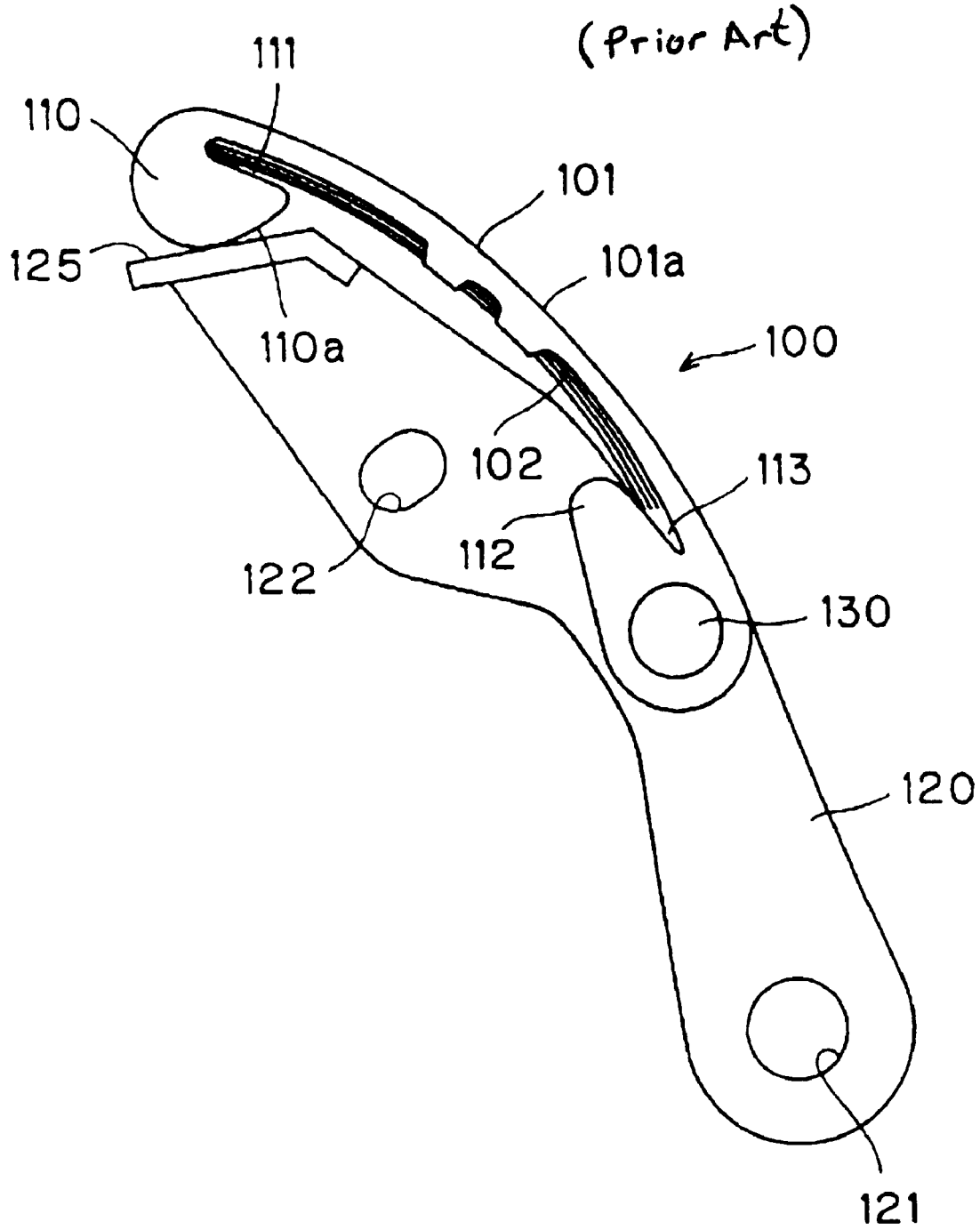
FIG. 11 illustrates the operation of a conventional blade tensioner.

As shown in FIGS. 6–8, each bushing can have a triangular cross-section. Incidentally, reference characters, the same as those in the previous embodiments indicate the same or equivalent parts. That is, bushing 6', with triangular cross-section is provided in place of bushing 6 with circular cross-section. And, bushing 6' is press-fit into the small diameter part (not shown) with circular cross-section of another bushing with triangular cross-section (see large diameter part 52' in FIG. 7). The small diameter part of another bushing is press-fitted into a hole in projecting portion 22 of blade shoe 2.

In such case, the contact area (pressure bearing area) of each bushing with blade spring 3 can be made larger, as shown by the cross-hatched zone in FIG. 8. Thereby, the surface pressure is reduced and wear resistance is improved. In addition, the span of blade spring 3 can be held at a constant value, so that the loading property of blade spring 3 can be make linear for easier control of loading.

Furthermore, both ends of the contact surface of each bushing with blade spring 3 can be located more toward the side of the blade spring's tip, as shown in FIG. 8 (right side in the figure) than cut-out 3b of the blade spring. Thereby, the concentration of stress at cut-out 3b of blade spring 3 can be avoided when blade spring 3 deforms. A polygonal cross-section other than the triangle can be used as the cross-section of each bushing.

As detailed above, a pin that is press-fit on the fixed end of the blade shoe is inserted into the bushing. The bushing and pin in the blade tensioner of this invention are made of metal; therefore, the difference in the magnitudes of thermal deformation between bushing and pin can be made smaller and the clearance between the two components can be made nearly constant, so that the shoe can always rotate smoothly around the pin. As a result, deterioration of response due to temperature fluctuation can be reduced.

While several embodiments of the invention are illustrated, it will be understood that the invention is not limited to these embodiments. Those skilled in the art to which the invention pertains may make modifications and other embodiments employing the principles of this invention, particularly upon considering the foregoing teachings.

What is claimed is:

1. A chain tensioner comprising:

a base;

an arcuately shaped shoe having a sliding face on a first side for contact with an associated chain;

a blade spring provided along said shoe on a second side of said shoe opposite from said sliding face, said blade spring having end portions;

said shoe having a fixed end provided with a press-fit bushing formed of metal, and a free end opposite said fixed end, said free end in sliding contact with a slide face formed on said base, said end portions of said blade spring being inserted into grooves formed respectively at said fixed end and said free end of said shoe, said end portion of said blade spring at said fixed end of said shoe contacting said bushing at a pivot point applying a load on said blade spring, and a pin fixed to said base, said pin being formed of metal and inserted into said metal bushing for rotation with respect to said bushing, said bushing and said pin being of metal selected to have thermal expansion properties effective to maintain smooth rotation of said shoe relative to said pin throughout a range of different temperatures.

2. The chain tensioner of claim 1, wherein said bushing has a circular cross-sectional shape.

3. The blade-type chain tensioner of claim 1, wherein said bushing has a circular cross-sectional shape.

4. The chain tensioner of claim 1, wherein said end of said blade spring adjacent said fixed end of said shoe is positioned between said bushing and said blade shoe.

5. The chain tensioner of claim 4, wherein said bushing has a circular cross-sectional shape.

6. The blade-type tensioner of claim 4, wherein said bushing has a cross-sectional shape formed of a multi-sided polygon.

7. A chain tensioner comprising:

a base;

a pin formed of metal and fixed to said base;

an arcuately shaped shoe having a sliding face on a first side for contact with an associated chain, said shoe having a fixed end and a free end, said free end in sliding contact with a slide face formed on said base;

a protruding portion of said shoe being formed adjacent said fixed end of said shoe in a central location of said face opposite said chain sliding face;

a stepped bushing formed of metal having central and end portions, said central portion having a first diameter, said end portions having a second diameter, said second diameter being greater than said first diameter, said stepped bushing being tightly received into a hole formed transversely through said protruding portion, said pin being inserted into said stepped bushing for rotation with respect to said stepped bushing;

a blade spring provided along said shoe on a face opposite said sliding face of said blade shoe, said blade spring having end portions;

one of said end portions of said blade spring adjacent said fixed end of said shoe being inserted in to a clearance between said stepped bushing and said shoe and having a longitudinal notch formed therein into which said protruding portion is received.

8. The chain tensioner of claim 7, wherein said stepped bushing has a circular cross-sectional shape.

9. The blade-type chain tensioner of claim 7, wherein said stepped bushing has a cross-sectional shape formed of a multi-sided polygon.

10. (Once Amended) A chain tensioner comprising:

an arcuately shaped shoe having a sliding face on a first side for contact with an associated chain;

at least one blade spring provided along a second side of the shoe opposite from the sliding face, the blade spring having end portions;

a metal bushing connected relative to the shoe proximate an end thereof, one of the end portions of the blade spring being inserted between the bushing and the second side of the shoe, the end portion of the blade spring at the end of the shoe contacting the bushing at a pivot point, the bushing and the blade spring cooperating to maintain the pivot point in a substantially constant position relative to the blade spring end at varying temperatures, the metal bushing effective to reduce deformation of the spacing between the metal bushing and the second side of the shoe during thermal expansion of the shoe.

* * * * *